(12) United States Patent
Xia et al.

(10) Patent No.: US 8,369,671 B2
(45) Date of Patent: Feb. 5, 2013

(54) HERMETICALLY SEALED FIBER SENSING CABLE

(75) Inventors: Hua Xia, Altamont, NY (US); Axel Busboom, Unterleinleiter (DE); Kevin Matthew Durocher, Waterford, NY (US); Renato Guida, Wynantskill, NY (US); George Theodore Dalakos, Niskayuna, NY (US); Glen Peter Koste, Niskayuna, NY (US); Boon Kwee Lee, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 523 days.

(21) Appl. No.: 12/714,177

(22) Filed: Feb. 26, 2010

(65) Prior Publication Data
US 2011/0211795 A1  Sep. 1, 2011

(51) Int. Cl.
*G02B 6/02* (2006.01)
*G02B 6/00* (2006.01)
*G02B 6/44* (2006.01)

(52) U.S. Cl. .......... 385/123; 385/12; 385/100; 385/102; 385/128; 385/141

(58) Field of Classification Search .................... 385/12, 385/13, 37, 100, 102, 123, 124, 126, 127, 385/128, 141
See application file for complete search history.

(56) References Cited

U.S. PATENT DOCUMENTS

| | | | |
|---|---|---|---|
| 4,727,237 A | 2/1988 | Schantz | |
| 5,000,541 A | 3/1991 | DiMarcello et al. | |
| 5,013,130 A | 5/1991 | Atkins et al. | |
| 5,702,498 A | 12/1997 | Huang | |
| 5,828,059 A | 10/1998 | Udd | |
| 5,841,131 A | 11/1998 | Schroeder et al. | |
| 5,844,927 A | 12/1998 | Kringlebotn | |
| 5,925,879 A | 7/1999 | Hay | |
| 6,845,199 B2 | 1/2005 | Decaumont et al. | |
| 7,151,872 B1 | 12/2006 | Xia et al. | |
| 7,171,093 B2 | 1/2007 | Kringlebotn et al. | |

(Continued)

FOREIGN PATENT DOCUMENTS

| | | |
|---|---|---|
| EP | 0308143 A1 | 3/1989 |
| EP | 0419882 A1 | 4/1991 |

(Continued)

OTHER PUBLICATIONS

Search Report and Written Opinion from corresponding PCT Application No. PCT/US2011/024677 dated Jun. 22, 2011.

*Primary Examiner* — Brian Healy
*Assistant Examiner* — Hung Lam
(74) *Attorney, Agent, or Firm* — Andrew J. Caruso

(57) ABSTRACT

In one aspect, the present invention provides a hermetically sealed fiber sensing cable comprising: a core fiber comprising at least one Bragg grating region, an outer surface and a length; a fiber cladding in contact with the core fiber along the entire length of the core fiber, the fiber cladding having an outer surface and a length; a carbon layer disposed upon the outer surface of the fiber cladding along the entire length of the fiber cladding, the carbon layer comprising diamond-like carbon; a hydrogen ion absorption layer in contact with the carbon layer, the hydrogen ion absorption layer being disposed on the outer surface of the carbon layer; and an outer sleeve. Also provided in another aspect of the present invention, is a component for a hermetically sealed fiber sensing cable.

22 Claims, 6 Drawing Sheets

U.S. PATENT DOCUMENTS

| | | |
|---|---|---|
| 2005/0183507 A1 | 8/2005 | Bailey et al. |
| 2006/0222306 A1* | 10/2006 | Homa et al. ............ 385/123 |
| 2008/0247718 A1 | 10/2008 | Dowd et al. |
| 2008/0273852 A1 | 11/2008 | Parker et al. |
| 2009/0074347 A1 | 3/2009 | Xia et al. |
| 2009/0123119 A1 | 5/2009 | Varkey |

FOREIGN PATENT DOCUMENTS

| | | |
|---|---|---|
| EP | 0437937 B1 | 9/1994 |
| EP | 1369725 A1 | 12/2003 |
| WO | 9932863 A1 | 7/1999 |

* cited by examiner

HERMETICALLY SEALED FIBER SENSING CABLE

BACKGROUND

The invention relates generally to an optic fiber sensing cable, and more particularly to a hermetically sealed fiber sensing cable.

Fiber Bragg gratings can be wavelength multiplexed along one fiber, making them attractive for measurements of strain and temperature. The fiber Bragg gratings can also be used as a pressure-temperature sensor by measuring the shift in Bragg wavelength caused by a change in hydrostatic pressure or a change in temperature, thereby providing a simple sensor design with small dimensions and good reproducibility and long-term stability. Fiber optic sensors are widely used in the oil and gas industry for monitoring down-hole parameters such as pressure, temperature, hydrocarbon flow and seismic status. However, when the fiber Bragg grating sensors are operated under conditions of high temperature, such as in oil and gas wells, a considerable drift effect both in fiber Bragg grating and birefringent interferometric sensors may be observed. The drift effect is believed to occur when the fiber is surrounded by a fluid, such as water, oil, or gaseous hydrocarbons. This drift effect is found to increase with increase in temperature.

The drift effect may be due to ingress of a liquid such as water into the fiber cladding resulting in the development of additional tensile stress on the core fiber. Generally, such stress may modify the effective refractive indices in both the fiber cladding and the fiber core resulting in changes in the resonant wavelength of a Bragg grating disposed within the core fiber. In addition, diffusion of gases, such as hydrogen, into the fiber, may cause a change in the refractive index proportional to the hydrogen concentration, and consequently causes a drift in the resonant wavelength. Therefore, there is a need to provide fiber sensing cables which limit the ingress of exogenous materials such as water and hydrogen into the optic fiber, thereby limiting transmission losses and increasing the reliability of the fiber sensing cable.

One solution known in the art is to apply a carbon coating, or other hermetic coating on the outer surface of the cladding surrounding the core fiber of the Bragg grating sensor in order to protect the optical fiber and sensors. Carbon has been shown to provide a good hermetic coating for optical fibers, making them less permeable to both water and hydrogen. However, one of the disadvantages of using a carbon coating is that conventional carbon coatings are thermally stable up to a temperature of only about 300 degrees centigrade. Beyond this temperature, the carbon layer begins to lose its hermeticity.

Thus, conventional carbon coatings have to be protected by an outer polymer coating such as a polyimide coating layer, in order to protect the carbon from losses resulting from high temperature processes such as oxidization. Generally, however, the protective polymer layer is itself subject to decomposition at high temperature, and the level of protection afforded by a protective polymer coating atop the carbon layer is itself limited. This generally limits the use of carbon-coated optic fiber sensing cables to temperatures less than about 300° C. As will be appreciated by those of ordinary skill in the art, temperatures in hydrocarbon wells or geothermal wells, in which the fiber optic sensing cables might otherwise be used to advantage, may exceed the operating temperature capabilities of the fiber optic sensing cables, thereby marginalizing their utility to monitor conditions within such wells.

Metal coating layers have also employed as an alternative to conventional carbon coatings. However, the use of the metal coating layers may result signal attenuation due microbending effects, and field energy leakage from the core fiber to the cladding.

Therefore there remains a need for hermetically sealed fiber sensing cables which resist the ingress of water and hydrogen into the fiber cladding and core fiber even when the sensing cable is used in harsh environments, for example at temperatures in excess of 300° C., in order to avoid signal transmission losses while retaining the adequate mechanical strength.

BRIEF DESCRIPTION

In one aspect, the present invention provides a hermetically sealed fiber sensing cable comprising: a core fiber comprising at least one Bragg grating region, an outer surface and a length; a fiber cladding in contact with the core fiber along the entire length of the core fiber, the fiber cladding having an outer surface and a length; a carbon layer disposed upon the outer surface of the fiber cladding along the entire length of the fiber cladding, the carbon layer comprising diamond-like carbon; a hydrogen ion absorption layer in contact with the carbon layer, the hydrogen ion absorption layer being disposed on the outer surface of the carbon layer; and an outer sleeve.

In another aspect, the present invention provides a hermetically sealed fiber sensing cable comprising: a core fiber comprising at least one tetrahedral Bragg grating region, an outer surface and a length; a fiber cladding in contact with the core fiber along the entire length of the core fiber, the fiber cladding having an outer surface and a length; a carbon layer disposed upon the outer surface of the fiber cladding along the entire length of the fiber cladding, the carbon layer comprising diamond-like carbon; a hydrogen ion absorption layer in contact with the carbon layer, the hydrogen ion absorption layer being discontinuously disposed on the outer surface of the carbon layer corresponding to the Bragg grating region; and an outer sleeve.

In yet another aspect, the present invention provides a component for a hermetically sealed fiber sensing cable comprising: a core fiber comprising at least one tetrahedral Bragg grating region, an outer surface and a length; a fiber cladding in contact with the core fiber along the entire length of the core fiber, the fiber cladding having an outer surface and a length; a carbon layer disposed upon the outer surface of the fiber cladding along the entire length of the fiber cladding, the carbon layer comprising diamond-like carbon; and a hydrogen ion absorption layer in contact with the carbon layer, the hydrogen ion absorption layer being disposed on the outer surface of the carbon layer.

In one another aspect, the present invention provides a component for a hermetically sealed fiber sensing cable comprising: a core fiber comprising at least one tetrahedral Bragg grating region, an outer surface and a length; a fiber cladding in contact with the core fiber along the entire length of the core fiber, the fiber cladding having an outer surface and a length; a carbon layer disposed upon the outer surface of the fiber cladding along the entire length of the fiber cladding, the carbon layer comprising diamond-like carbon; and a hydrogen ion absorption layer in contact with the carbon layer, the hydrogen ion absorption layer being discontinuously disposed on the outer surface of the carbon layer corresponding to the Bragg grating region.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

DETAILED DESCRIPTION

Figure 1:
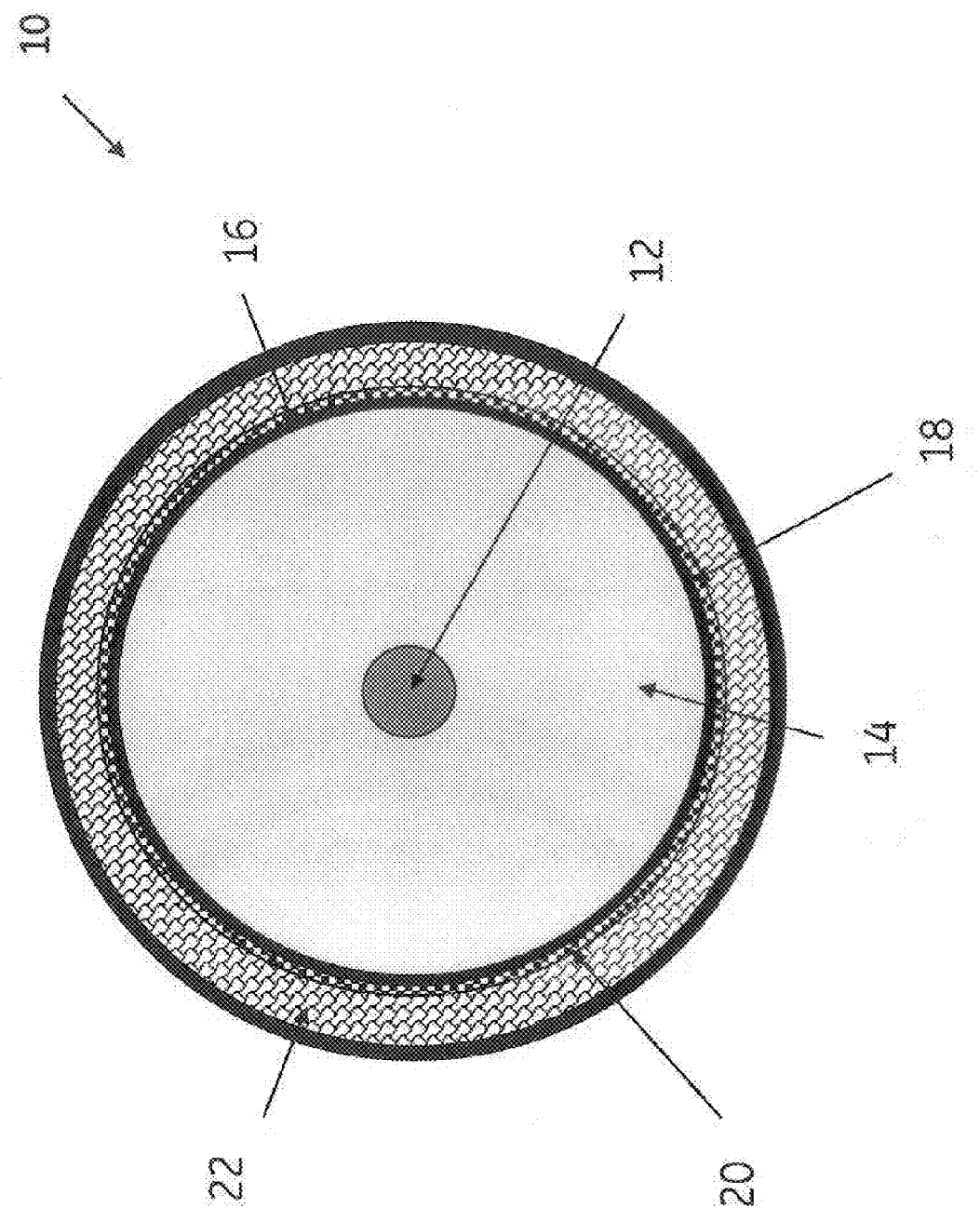
FIG. 1 is a cross-section of a hermetically sealed fiber sensing cable in accordance with an embodiment of the invention.

In the following specification and the claims, which follow, reference will be made to a number of terms, which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

It is also understood that terms such as "top," "bottom," "outward," "inward," and the like are words of convenience and are not to be construed as limiting terms. Furthermore, whenever a particular feature of the invention is said to comprise or consist of at least one of a number of elements of a group and combinations thereof, it is understood that the feature may comprise or consist of any of the elements of the group, either individually or in combination with any of the other elements of that group.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As discussed in detail below, embodiments of the present invention include a hermetically sealed fiber sensing cable comprising: a core fiber comprising at least one Bragg grating region, an outer surface and a length; a fiber cladding in contact with the core fiber along the entire length of the core fiber, the fiber cladding having an outer surface and a length; a carbon layer disposed upon the outer surface of the fiber cladding along the entire length of the fiber cladding, the carbon layer comprising diamond-like carbon; a hydrogen ion absorption layer in contact with the carbon layer, the hydrogen ion absorption layer being disposed on the outer surface of the carbon layer; and an outer sleeve.

As used herein the term "Bragg grating region" is defined as a portion of the core fiber having a length $L_1$ and containing a Bragg grating such that the Bragg grating is centered at a distance about $L_1/2$ from the ends of the portion of the core fiber defining the Bragg grating region. The ends of the portion of the core fiber defining the Bragg grating region are, in general, indistinguishable from the core fiber and their locations are defined by the position and length of the Bragg grating contained within the Bragg grating region. As used herein the term "Bragg grating" is defined as a permanent periodic refractive index modulation in the core of an optical fiber over a length of typically 1-20 mm. In one embodiment, the Bragg grating may be created in the optic fiber by transversely illuminating the fiber with a periodic interference pattern generated by ultra-violet (UV) laser light. Those of ordinary skill in the art will appreciate that the core fiber used as the starting material for the creation of a core fiber containing a Bragg grating, will contain one or more photochemically reactive components which when exposed to relatively high energy laser light configured as, for example, an interference pattern, will react and thereby create the Bragg grating structure within the core fiber. The Bragg grating structure is highly stable in the sense that the relatively low energy light to which the Bragg grating is exposed during operation a fiber optic sensor containing the Bragg grating, is insufficient to cause rapid degradation of the Bragg grating created by exposure to the high energy laser light, or further reaction of unreacted photochemically reactive components within the core fiber used as the starting material. As used herein, the term "photochemically reactive component" includes materials which undergo either or both of photochemically allowed transformation and thermally allowed transformation in response to exposure to UV laser light. Typically, the length of Bragg grating region is from about 1.5 to about 100 times the length of the Bragg grating contained within the Bragg grating region, and the Bragg grating is more or less symmetrically disposed within the Bragg grating region. In one embodiment, the length of the Bragg grating region is from about 2 to about 50 times the length of the Bragg grating contained within the Bragg grating region. In another embodiment, the length of the Bragg grating region is from about 5 to about 10 times the length of the Bragg grating contained within the Bragg grating region.

As noted, the core fiber comprises an outer surface and a length and the core fiber includes at least one Bragg grating region. In one embodiment, the core fiber includes a plurality of Bragg grating regions. In one embodiment, the fiber Bragg grating is a thermally stable, tetrahedral fiber Bragg grating.

Core fibers for fiber optic sensors are known to those of ordinary skill in the art. Typically, the core fiber includes at least one material selected from the group consisting of silica, silicate glass, germanium doped silica, fluorided optical fiber material doped with fluorine, chlorine co-doped silicon dioxide, and the like. In one embodiment the core fiber includes a fluorine and germanium dioxide co-doped optical fiber material. In one embodiment, the core fiber includes at least one germanium oxide doped photosensitive material. In one embodiment, the core fiber is silica. In another embodiment, the core fiber includes a chlorine and germanium dioxide co-doped silicate glass. Non limiting examples of doped silicate glass include germanium doped silica, nitrogen doped silicate, germanium dioxide doped silica, and the like.

In one embodiment, the core fiber has a diameter in a range from about 3 microns to about 15 microns. In another embodiment, the core fiber has a diameter in a range from about 6 microns to about 10 microns.

In one embodiment, the core fiber is polarization independent medium. In another embodiment, the core fiber is a polarization-maintaining medium. In yet another embodiment, the core fiber has a low transmission loss window at around 800 nm. In another embodiment, the core fiber has a low transmission loss window at around 1.55 microns. In one embodiment, the core fiber has a circular cross-section.

The core fiber is in contact with a fiber cladding along the entire length of the core fiber. The fiber cladding includes an outer surface and a length. In one embodiment, the refractive index of the fiber cladding is lower than the refractive index of the core fiber, so that light transmitted axially along the core fiber is substantially retained within the core fiber. In another embodiment, the fiber cladding includes at least one fluorine doped material. Examples of the fluorine doped cladding include but are not limited to silicon dioxide, silicon dioxide co-doped with germanium dioxide and fluorine, silicon dioxide co-doped with germanium dioxide, chlorine and fluorine, fluorine and phosphorus co-doped silicon dioxide.

In one embodiment, the fiber cladding includes a silicon dioxide co-doped with germanium dioxide and fluorine. In one embodiment, the fiber cladding includes a silicon dioxide co-doped from about 10 weight percent to about 20 weight percent germanium dioxide and from about 1.0 weight percent to about 2.5 weight percent fluorine. In another embodiment, the fiber cladding includes a silicon dioxide co-doped with about 8 weight percent germanium dioxide and 0.5 weight percent fluorine. In yet another embodiment, the fiber cladding is a fluorine and phosphorus co-doped silicon dioxide. In one embodiment, the fiber cladding includes silicon dioxide co-doped with from about 1 weight percent to about 1.5 weight percent phosphorus and from about 0.5 weight percent to about 2.5 weight percent fluorine.

In one embodiment, the hermetically sealed fiber sensing cable provided by the present invention includes a carbon layer disposed upon the outer surface of the fiber cladding along the length of the fiber cladding. The carbon layer includes diamond-like carbon. As used herewith the term "diamond-like carbon" also sometimes known as "amorphous hydrogenated carbon (a-C:H)", is defined as primarily including single bonded carbon as could be deposited and characterized using techniques known to one skilled in the art such as chemical vapor deposition and Raman spectroscopy. In one embodiment, the carbon layer includes from about 10% to about 99% of diamond-like carbon. In another embodiment, the carbon layer includes from about 50% to about 99% of diamond-like carbon. In yet another embodiment, the carbon layer includes from about 75% to about 99% of diamond-like carbon. In one embodiment, the diamond-like carbon is uniformly distributed in the carbon layer. In another embodiment, the diamond-like carbon is present in a random manner in the carbon layer. In yet another embodiment, the diamond like carbon is present only in the portions of carbon layer corresponding to the Bragg grating regions. In one embodiment, the carbon layer comprising the diamond-like carbon is optically transparent, and an electrically insulating layer. In another embodiment, the carbon layer comprising the diamond-like carbon is scratch resistant. In one embodiment, the carbon layer has hydrophobic properties even at high temperatures such as at 500° C.

In one embodiment, the properties of the carbon layer are dependent on the process of deposition of the carbon layer upon the fiber cladding. Several known techniques may be employed to dispose the carbon layer upon the fiber cladding, examples include but are not limited to radio-frequency plasma assisted chemical vapor deposition, parallel plate reactive ion etches, and the like. In one embodiment, applying the carbon layer upon the fiber cladding includes a post annealing step at a temperature in the range from about 450° C. to about 650° C. to eliminate or reduce internal residual stresses in the carbon layer, in addition to stabilizing the layer by formation of a tetrahedral structure in the carbon layer. In one embodiment, the carbon layer has a thickness from about 0.1 micron to about 15 microns. In another embodiment, the carbon layer has a thickness from about 1 micron to about 10 microns.

The hermetically sealed fiber includes a hydrogen ion absorption layer which is in contact with the carbon layer. In one embodiment, the hydrogen ion absorption layer is disposed on the outer surface of the carbon layer. In another embodiment, the hydrogen ion absorption layer is disposed on the outer surface of the carbon layer along the entire length of the carbon layer. In another embodiment, the hydrogen ion absorption layer is disposed discontinuously on the outer surface of the carbon layer. In yet another embodiment, the hydrogen ion absorption layer is discontinuously disposed on the outer surface of the carbon layer corresponding to the Bragg grating region or regions. In another embodiment, the carbon layer includes a "hard" diamond-like carbon material in contact with the hydrogen ion absorption layer.

In one embodiment, the hydrogen ion absorption layer includes a metal. In another embodiment, the metal is a metal alloy having a general formula (I)

$$M_x A_{(1-x)} B_{(1-y)} \qquad (I),$$

wherein M is at least one metal selected from the group consisting of palladium, and platinum, B is at least one metal selected from the group consisting of silver, gold, nickel, and copper, x is a number greater than 0, and y is a number less than 0.5. In another embodiment, the hydrogen ion absorption layer comprises palladium oxide. In one embodiment, the hydrogen ion absorption layer consists essentially of palladium oxide.

As its name suggests, the hydrogen ion absorption layer may capture hydrogen and hydrogen ions and protects the fiber cladding and the core fiber from the negative effects (e.g. darkening) of hydrogen exposure. The hydrogen ion absorption layer may also serve to reduce or prevent the loss of carbon from the carbon layer in a high temperature environment. The loss of carbon from the carbon layer in the high temperature environment may occur due to loss mechanisms such as oxidation of the carbon to carbon monoxide, or carbon dioxide which may occur at high temperatures. It is believed that the hydrogen ion absorption layer absorbs hydrogen ions by formation of metal hydride species. The hydrogen ion absorption layer may be designed such that it has a high affinity for hydrogen and/or hydrogen ions. In one embodiment, the hydrogen ion absorption layer has a thickness from about 0.05 micron to about 25 microns. In another embodiment, the hydrogen ion absorption layer has a thickness from about 1 micron to about 10 microns.

The hermetically sealed fiber sensing cable provided by the present invention includes an outer sleeve. In one embodiment, the outer sleeve has a coefficient of thermal expansion similar to the coefficient of thermal expansion of the core fiber and the fiber cladding. In another embodiment, the outer sleeve includes a silica fiber material having a coefficient of thermal expansion similar to the coefficient of thermal expansion of the core fiber and the fiber cladding. The outer sleeve forms a casing which protects the core fiber, the fiber cladding, the carbon layer and the hydrogen ion absorption layer. In one embodiment, the outer sleeve comprises at least one material is selected from the group consisting of alumina, silica fiber, ceramic fibers, refractory oxides, and combinations of any of the foregoing materials. In another embodiment, the outer sleeve comprises alumina. In yet another embodiment, the outer sleeve comprises fluorinated alumina. In one embodiment, the outer sleeve has porous structure. In another embodiment, the outer sleeve has been treated with a fluorinated gas, for example $CF_4$, $C_3F_8$, $C_4F_8$ and the like. In one embodiment, the outer sleeve has good thermal resistance while being resistant to oil and moisture. In one embodiment, the outer sleeve has a maximum operation temperature in a range from about 1000° F. to about 2000° F. Such high temperature materials are available from The Cotronics Corporation (Brooklyn, N.Y.), a supplier of high-temperature materials, for example, the Thermeez product line.

Referring to FIG. 1, the figure shows a cross-section of the hermetically sealed fiber sensing cable (10) in accordance to one embodiment of the invention. The hermetically sealed fiber sensing cable (10) includes a core fiber (12) and a fiber cladding (14) in contact with the core fiber (12). The core fiber (12) includes at least one Bragg grating region (not shown). A carbon layer (16) is disposed on the outer surface (18) of the fiber cladding (14). A hydrogen ion absorption layer (20) is disposed on the outer surface of the carbon layer and an outer sleeve (22) encasing the various layers of the hermetically sealed fiber. Although not shown in FIG. 1, the core fiber (12) and the fiber cladding (14) may include more than one layer of silica.

Figure 2:
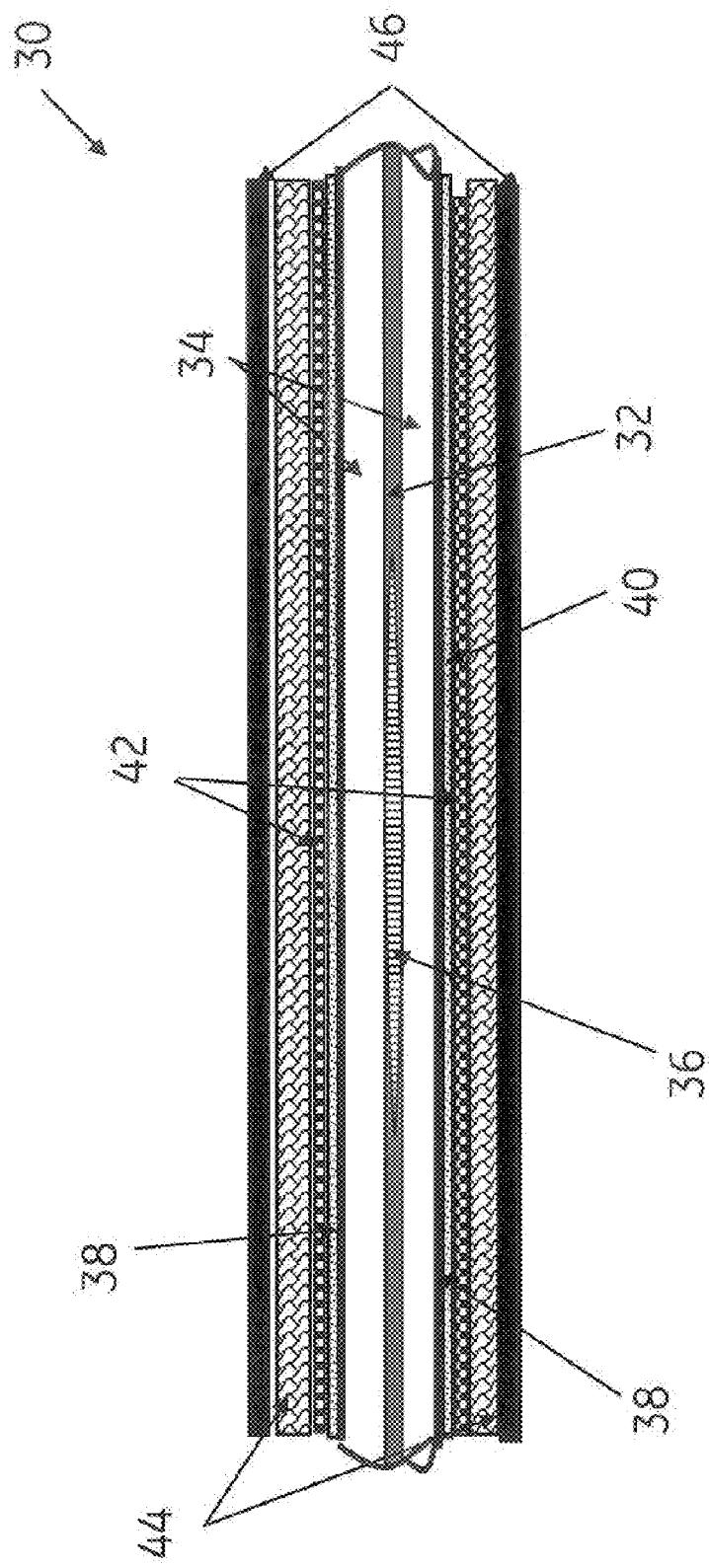
FIG. 2 is a section of a hermetically sealed fiber sensing cable in accordance with an embodiment of the invention.

FIG. 2 is a hermetically sealed fiber sealing cable (30) according to one embodiment of the invention. The hermetically sealed fiber sensing cable (30) includes a core fiber (32) and a fiber cladding (34) in contact with the core fiber (32). The core fiber (32) includes at least one Bragg grating (36). A carbon layer (38) is disposed on the outer surface (40) of the fiber cladding (34). A hydrogen ion absorption layer (42) is disposed on the outer surface of the carbon layer and an outer sleeve (44) encasing the various layers of the hermetically sealed fiber. A metal sheath (46) is in contact with the outer sleeve (44). The hydrogen ion absorption layer (42) is disposed on the outer surface of the carbon layer (38) corresponding to the Bragg grating (36).

Figure 3:
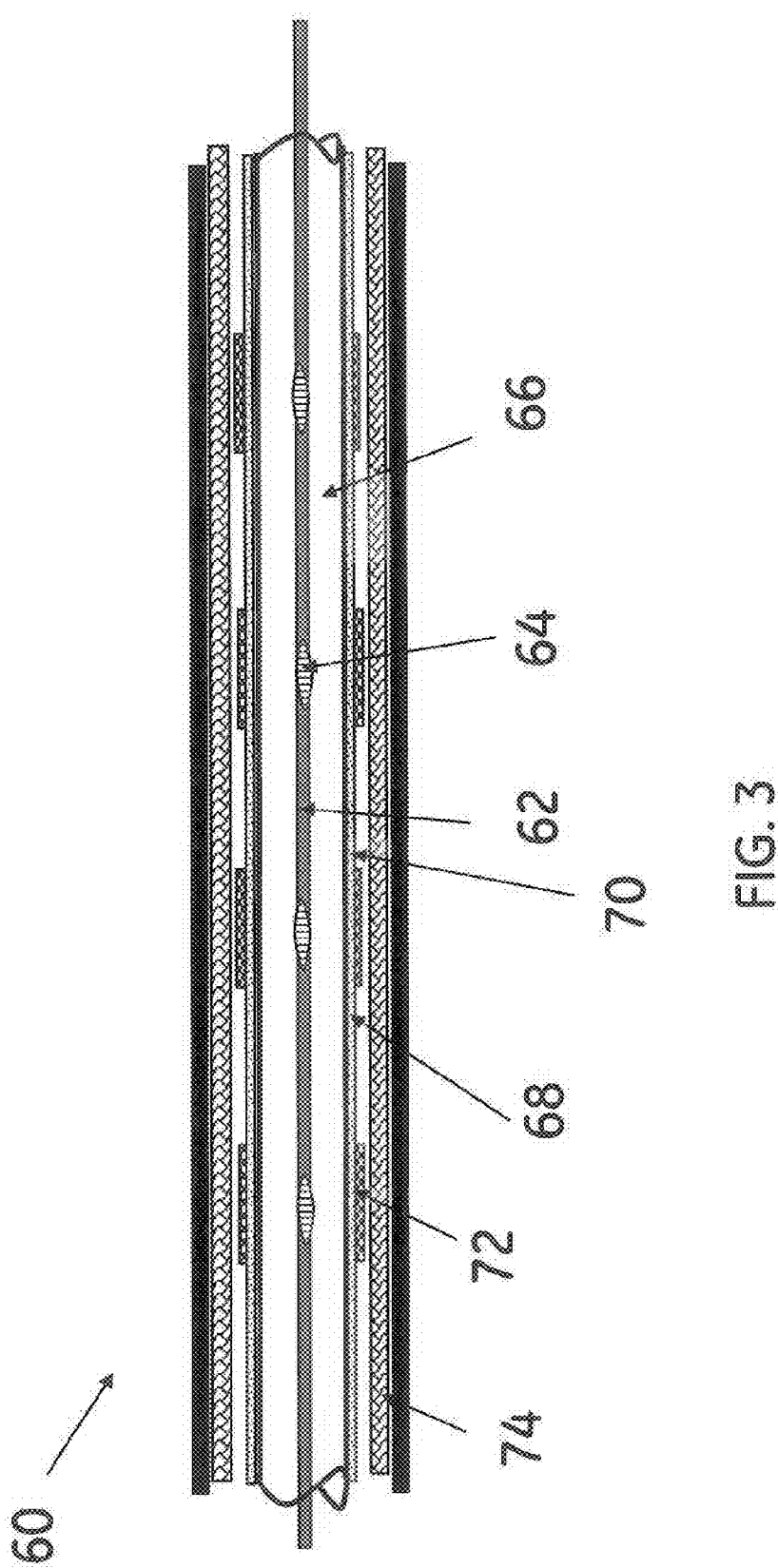
FIG. 3 is a section of a hermetically sealed fiber sensing in accordance with an embodiment of the invention.

FIG. 3 depicts a hermetically sealed fiber sensing cable (60) in accordance to another embodiment of the invention. The hermetically sealed fiber sensing cable (60) includes a core fiber (62) having a plurality of Bragg gratings (64). The fiber cladding (66) is in contact with the core fiber (62). A carbon layer (68) is disposed on the outer surface (70) of the fiber cladding (66). A hydrogen ion absorption layer (72) is disposed on the outer surface of the carbon layer (68) and an outer sleeve (74) encasing the various layers of the hermetically sealed fiber. The hydrogen ion absorption layer (72) is discontinuously disposed on the outer surface of the carbon layer (68) corresponding to the Bragg gratings (64).

Figure 4:
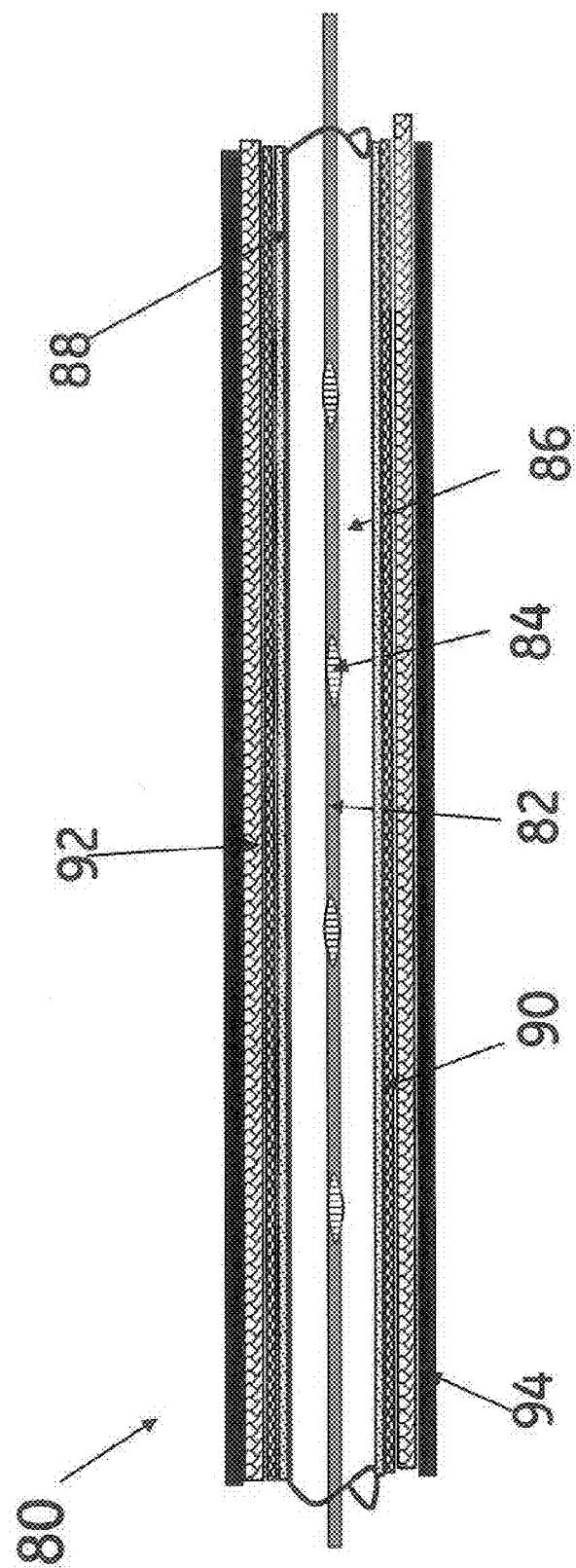
FIG. 4 is a section of a hermetically sealed fiber sensing cable in accordance with an embodiment of the invention.

FIG. 4 depicts a hermetically sealed fiber sensing cable (80) in accordance to one embodiment of the invention. The hermetically sealed fiber sensing cable (80) includes a core fiber (82) having a plurality of Bragg gratings (84). The fiber cladding (86) is in contact with the core fiber (82). A carbon layer (88) is disposed on the outer surface of the fiber cladding (86). A hydrogen ion absorption layer (90) is disposed on the outer surface of the carbon layer (88) and an outer sleeve (92) encasing the various layers of the hermetically sealed fiber. A metal sheath (94) is in contact with the outer sleeve (92). The hydrogen ion absorption layer (90) is continuously disposed along the entire length of the outer surface of the carbon layer (88) corresponding to the Bragg gratings (84).

Figure 5:
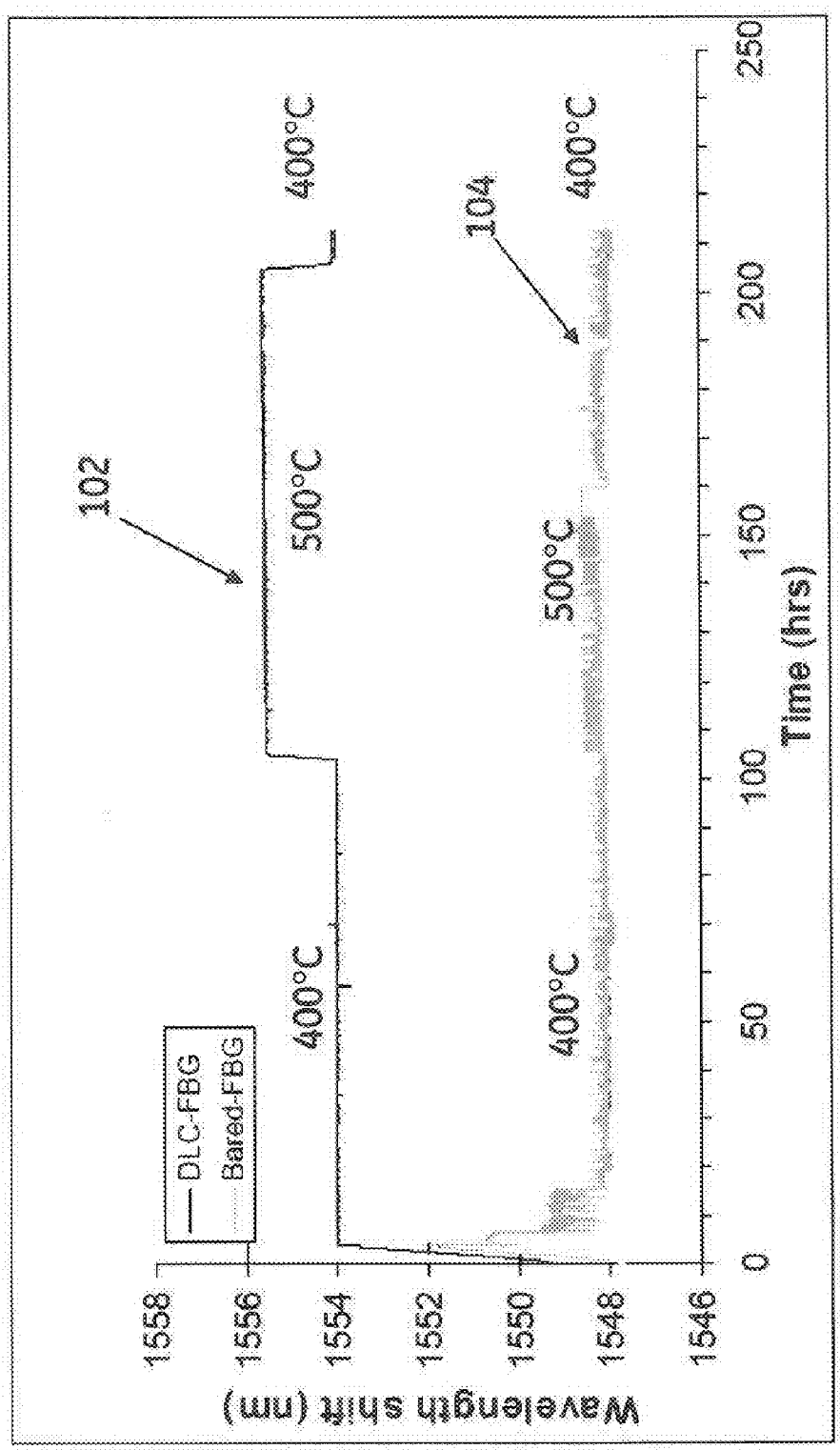
FIG. 5 illustrates performance differences between a fiber optic sensor comprising a protective diamond-like carbon barrier layer in the Bragg grating region, and an otherwise equivalent fiber optic sensor lacking a protective diamond-like carbon barrier layer in the Bragg grating region, the performance differences being determined in the presence of steam at high temperature.

FIG. 5 provides data demonstrating that a protective layer covering the Bragg grating region of an optic fiber sensor is sufficient to greatly improve the performance of the optic fiber sensor relative to a wholly unprotected optic fiber sensor. The plot (102) was measured using a 2 meter length of optic fiber comprising a fiber cladding and a core fiber containing a single Bragg grating about 10 mm long near the middle of the length of optic fiber and a diamond-like carbon layer covering the outer surface of the fiber cladding in the Bragg grating region which is about 2.5 times the length of the Bragg grating itself. The diamond-like coating layer had a thickness of about 0.5 microns and was deposited by one or more techniques known those of ordinary skill in the art. The plot (104) was measured using a 2 meter length of optic fiber comprising a fiber cladding and a core fiber containing a single Bragg grating about 10 mm long near the middle of the length of optic fiber but containing no protective diamond-like carbon layer in the Bragg grating region. The optic fiber used in each experiment was obtained from the O/E Land Inc. (Lasalle, Quebec). The Bragg grating was created using a conventional UV laser and phase mask grating inscription technique. The signal characteristics of each of the test optic fibers configured as optic fiber sensors were evaluated in a test rig in the presence of steam at 400° C. and 500° C. The data clearly shows that the without the additional protection afforded by the diamond-like carbon layer, the optic fiber sensor does not distinguish between a temperature of 400° C. and 500° C. (plot (104)). The presence of the diamond-like carbon layer covering the Bragg grating region is found to enhance the fiber optic sensors ability to distinguish between 400° C. and 500° C. over a prolonged period of time. While the origins of this improvement in temperature sensitivity in the harsh wet environment of the test rig are not well understood, the improvement is undeniably useful. This is especially so when one considers that the presence of the diamond-like carbon coating covering only the Bragg grating region (2.5 cm out of 200 cm) is unlikely to affect the equilibrium concentration of water in the Bragg grating region of the optic fiber after hours of exposure to steam at 400° C. and 500° C.

Figure 6:
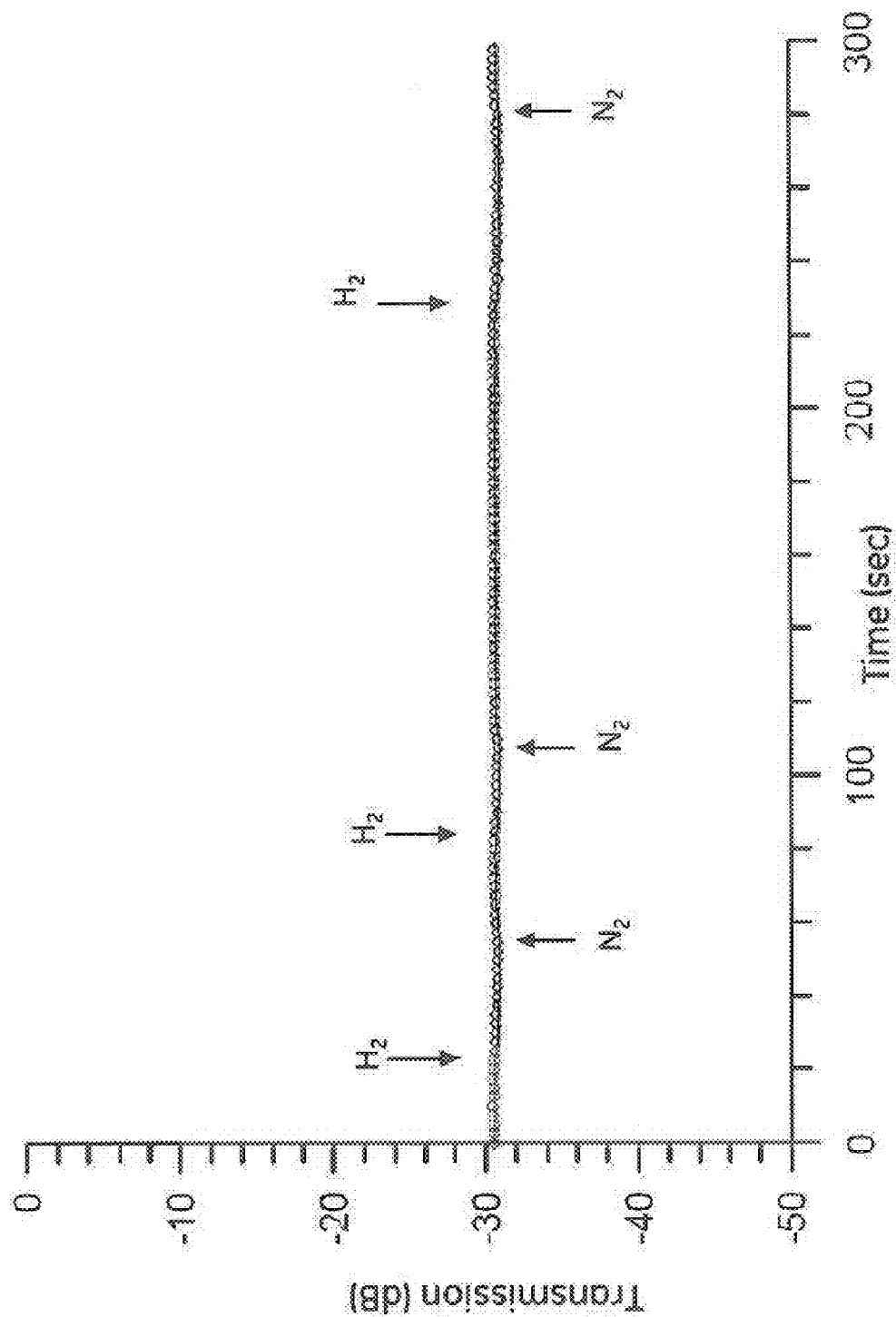
FIG. 6 shows the performance of a fiber optic sensor comprising a PdAu hydrogen ion absorption layer disposed around the Bragg grating region, which PdAu hydrogen ion absorption layer is effective to prevent transmission losses due to the ingress of hydrogen into the Bragg grating region after several hundred hours of operation.

FIG. 6 is a plot of the transmission loss from a fiber optic sensor comprising a core fiber containing a Bragg grating, a fiber cladding disposed around the core fiber, the fiber optic sensor being coated along it entire length with a 25 nanometer-thick palladium gold alloy $Pd_{(0.5)}Au_{(0.5)}$ hydrogen ion absorption layer in accordance with one embodiment of the invention. The hermetically sealed fiber optic sensor was contacted with a mixture of nitrogen gas blended with about 35% hydrogen for the period indicated at a temperature of about 125° C. It may be noted that there is negligible loss in transmission for the hermetically sealed fiber optic sensor when contacted with hydrogen gas at a temperature of 125° C. This stands in sharp contrast to the known sensitivity of unprotected (i.e. lacking a hydrogen ion absorption layer) fiber optic sensors to hydrogen exposure.

In one embodiment, the hermetic coating including the diamond-like carbon layer and the hydrogen ion absorption layer may be formed after drawing the fiber from the perform. In one embodiment, the diamond-like carbon layer and the hydrogen ion absorption layer may interact directly with the surface glass fiber to produce the desired adhesion required for hermeticity. In another embodiment, the hermetically sealed fiber cable is subjected to a post-thermal treatment to further eliminate internal stress, porosity defects and to improve the adhesion required for hermeticity.

Another aspect of the present invention includes a component for a hermetically sealed fiber sensing cable comprising: a core fiber comprising at least one Bragg grating region, an outer surface and a length; a fiber cladding in contact with the core fiber along the entire length of the core fiber, the fiber cladding having an outer surface and a length; a carbon layer disposed upon the outer surface of the fiber cladding along the entire length of the fiber cladding, the carbon layer comprising diamond-like carbon; and a hydrogen ion absorption layer in contact with the carbon layer, the hydrogen ion absorption layer being disposed on the outer surface of the carbon layer.

In one embodiment, the hermetically sealed fiber of the present invention, prevents in-diffusion of molecules from surrounding liquid or gas into the fiber cladding and the fiber core even at elevated temperatures, thereby reducing drift in the Bragg wavelength of the fiber Bragg grating. In one embodiment, the hermetically sealed fiber sensing cable is used in oil-wells, refineries or industrial processing applications as a sensor as temperature, strain and pressure sensors being operated at high temperatures while retaining the grating reflectivity and mechanical strength. In another embodiment, the hermetically sealed fiber of the present invention may be used in applications where resistance to static fatigue is significant examples fibers to be used in severe mechanical conditions, permeation to water or OH radicals being a concern.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hermetically sealed fiber sensing cable comprising:
   a core fiber comprising at least one Bragg grating region, an outer surface and a length;
   a fiber cladding in contact with the core fiber along the entire length of the core fiber, the fiber cladding having an outer surface and a length;
   a carbon layer disposed upon the outer surface of the fiber cladding along the entire length of the fiber cladding, the carbon layer comprising diamond-like carbon;
   a hydrogen ion absorption layer in contact with the carbon layer, the hydrogen ion absorption layer being disposed on the outer surface of the carbon layer; and
   an outer sleeve.

2. The hermetically sealed fiber in accordance to claim 1, wherein the core fiber comprises a plurality of Bragg grating regions.

3. The hermetically sealed fiber in accordance to claim 1, wherein the core fiber comprises at least one selected from the group consisting of silica, silicate glass, germanium doped silica, fluorine doped silica, silica doped with germanium oxide and fluorine.

4. The hermetically sealed fiber in accordance to claim 1, wherein the Bragg grating region has a length of about 2 to about 50 times the length of the Bragg grating.

5. The hermetically sealed fiber in accordance to claim 1, wherein the fiber cladding is at least one selected from the group consisting of a, silica, fluorine doped silica, chlorine doped silica.

6. The hermetically sealed fiber in accordance to claim 1, wherein the fiber cladding is doped with from about 0.5 weight percent to about 2.5 weight percent of fluorine.

7. The hermetically sealed fiber in accordance to claim 1, wherein the outer sleeve comprises alumina.

8. The hermetically sealed fiber in accordance to claim 1, wherein the outer sleeve comprises fluorinated alumina.

9. The hermetically sealed fiber in accordance to claim 1, wherein the outer sleeve comprises fluorinated alumina.

10. The hermetically sealed fiber in accordance to claim 1, wherein the outer sleeve comprises fluorinated alumina and ceramic fibers.

11. The hermetically sealed fiber in accordance to claim 1, wherein the outer sleeve comprises fluorinated silica fibers.

12. The hermetically sealed fiber in accordance to claim 1, wherein the hydrogen ion absorption layer comprises a metal alloy having a formula $$M_x A_{(1-x)} B_{(1-y)} \qquad (I)$$

wherein M is at least one metal selected from the group consisting of palladium, and platinum, B is at least one metal selected from the group consisting of silver, gold, nickel, and copper, x is a number greater than 0, and y is a number less than 0.5.

13. The hermetically sealed fiber in accordance to claim 1, wherein the hydrogen ion absorption layer comprises palladium.

14. The hermetically sealed fiber in accordance to claim 1, wherein the hydrogen ion absorption layer is discontinuously disposed upon the outer surface of the carbon layer.

15. The hermetically sealed fiber in accordance to claim 1, wherein the hydrogen ion absorption layer being discontinuously disposed on the outer surface of the carbon layer corresponding to the Bragg grating region.

16. The hermetically sealed fiber in accordance to claim 1, wherein carbon layer comprises a hard diamond-like carbon material in contact with the hydrogen ion absorption layer.

17. The hermetically sealed fiber in accordance to claim 1, wherein the hydrogen ion absorption layer has a thickness of 0.05 micron to about 25 micron.

18. The hermetically sealed fiber in accordance to claim 1, wherein the carbon layer comprises from about 10 percent to about 99 percent of diamond-like carbon.

19. The hermetically sealed fiber in accordance to claim 1, wherein the carbon layer has a thickness of 0.1 micron to about 15 micron.

20. A hermetically sealed fiber sensing cable comprising:
   a core fiber comprising at least one tetrahedral Bragg grating region, an outer surface and a length;
   a fiber cladding in contact with the core fiber along the entire length of the core fiber, the fiber cladding having an outer surface and a length;
   a carbon layer disposed upon the outer surface of the fiber cladding along the entire length of the fiber cladding, the carbon layer comprising diamond-like carbon;
   a hydrogen ion absorption layer in contact with the carbon layer, the hydrogen ion absorption layer being discontinuously disposed on the outer surface of the carbon layer corresponding to the Bragg grating region; and
   an outer sleeve.

21. A component for a hermetically sealed fiber sensing cable comprising:

a core fiber comprising at least one tetrahedral Bragg grating region, an outer surface and a length;

a fiber cladding in contact with the core fiber along the entire length of the core fiber, the fiber cladding having an outer surface and a length;

a carbon layer disposed upon the outer surface of the fiber cladding along the entire length of the fiber cladding, the carbon layer comprising diamond-like carbon; and a hydrogen ion absorption layer in contact with the carbon layer, the hydrogen ion absorption layer being disposed on the outer surface of the carbon layer.

22. A component for a hermetically sealed fiber sensing cable comprising:

a core fiber comprising at least one tetrahedral Bragg grating region, an outer surface and a length;

a fiber cladding in contact with the core fiber along the entire length of the core fiber, the fiber cladding having an outer surface and a length;

a carbon layer disposed upon the outer surface of the fiber cladding along the entire length of the fiber cladding, the carbon layer comprising diamond-like carbon; and a hydrogen ion absorption layer in contact with the carbon layer, the hydrogen ion absorption layer being discontinuously disposed on the outer surface of the carbon layer.

* * * * *